(No Model.)
M. W. CLAY.
PITMAN FOR SHAFT CRANKS.
No. 304,410. Patented Sept. 2, 1884.
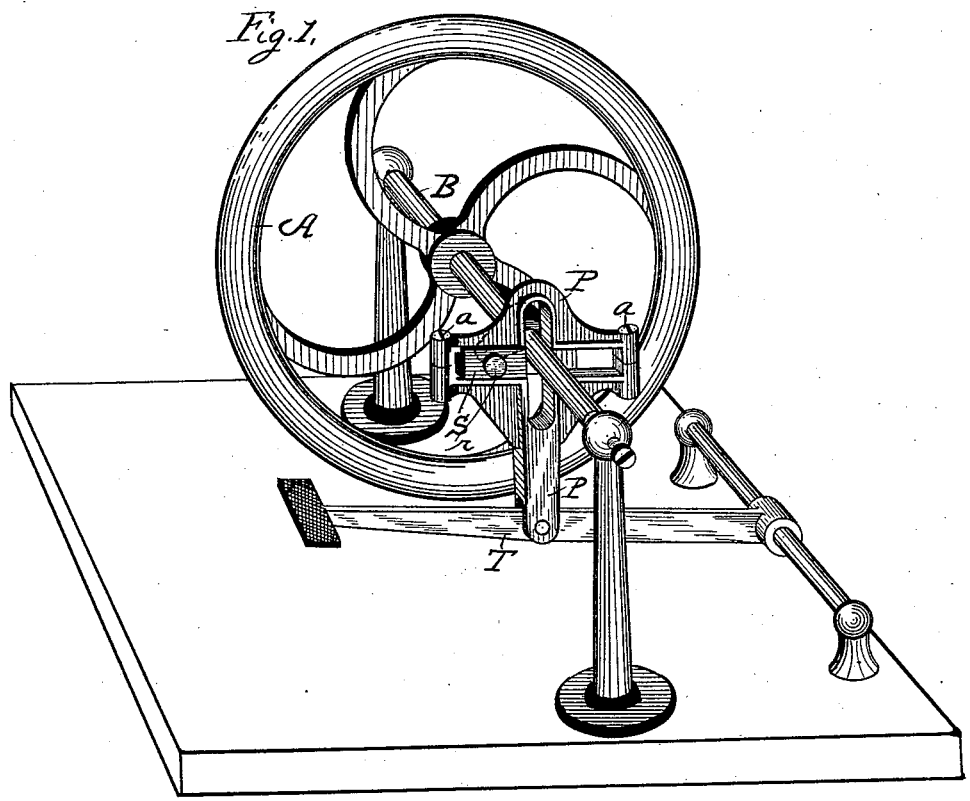
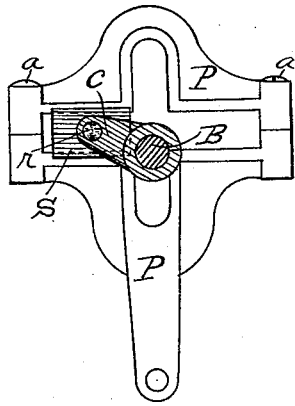
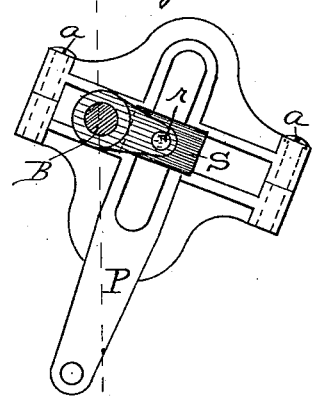
Witnesses.
Thos. J. Hutchins,
Wm. J. Hutchins,
Inventor.
Moses W. Clay.

UNITED STATES PATENT OFFICE.

MOSES W. CLAY, OF NEOSHO, ASSIGNOR OF ONE-HALF TO STILLWELL G. MERRILL, SAMUEL STILLWELL, AND GEORGE A. HYNES, ALL OF ST. LOUIS, MISSOURI.

PITMAN FOR SHAFT-CRANKS.

SPECIFICATION forming part of Letters Patent No. 304,410, dated September 2, 1884.

Application filed July 5, 1884. (No model.)

*To all whom it may concern:*

Be it known that I, MOSES W. CLAY, a citizen of the United States of America, residing at Neosho, in the county of Newton and State of Missouri, have invented certain new and useful Improvements in Pitmen for Shaft-Cranks, of which the following is a specification, reference being had therein to the accompanying drawings.

Figure 1 is a perspective view, and Figs. 2 and 3 side views, of the slotted pitman, showing its construction and the mode of its application to a crank located on a shaft between its ends at a distance from either end.

This invention relates to certain improvements in the pitman of an ordinary shaft-crank, whereby it is made possible to operate the crank by a pitman when the crank is attached to the shaft at a distance from either end, and whereby the crank may locked and rotation of the shaft arrested by means of the pitman when for any reason that is desirable.

Referring to the drawings, B is an ordinary straight shaft, having an ordinary crank, c, firmly secured to it along about its center. P is a pitman connecting the wrist r of the crank with a treadle, T, below, simply to show its operation. The pitman P is provided with a pair of slots, as shown, which cross each other at right angles at their center. One slot is shown as standing vertical and the other as horizontal. The sliding box S, into which the wrist r of crank c is boxed, traverses the horizontal slot when the shaft and crank rotate. The vertical slot incloses the shaft B, whereby the pitman is permitted to reciprocate over it. When the shaft B rotates, the sliding box S, carrying the wrist r, will traverse the horizontal slot reciprocally, and the pitman P will reciprocate vertically by means of the shaft B being inclosed in the vertical slot. The pitman is constructed in two parts, held together by means of the screws a a, to render it easy to apply to the crank and shaft. The crank should be of proper length to prevent the slide S from coming in contact with the shaft at the cross of the slots. If desired, the wrist r may be set in a slot in said crank, so it can be adjustable to regulate the length of its stroke. The crank may be locked and the shaft prevented from revolving by placing the pitman in the position shown in Fig. 3, so the shaft will be in the horizontal slot of the pitman. When the parts are in such position, it becomes utterly impossible for the shaft and crank to rotate, if for any reason such lock of the parts becomes desirable. By this construction of the pitman P it is possible to place the crank c at any place along on the shaft, and renders it unnecessary to bend the shaft into the form of a crank between its ends, in order to apply a pitman and crank at any place along its length. The crank in this case is arranged to be adjustably attached to the shaft, so its location can be changed at will. The pitman need not necessarily stand vertical, as shown in the drawings, but may be applied to the crank and shaft at any desired angle.

Having thus described my invention, what I claim as new, and desire to secure by Letters Patent, is as follows, to wit:

The combination of the shaft B, crank c, and slide S with the pitman P, having the cross-slots described for the reception of the shaft B and slide S, the said pitman being pivoted at its lower end to the driving mechanism in such manner that its upper end is free to vibrate or oscillate from side to side at right angles with said shaft, so it may be inclosed in the horizontal slot with the slide S and out of line with the vertical slot, for the purpose of locking and arresting the rotation of said shaft, substantially as set forth.

MOSES W. CLAY.

Witnesses:
J. TAYLOR BRENT,
GEO. A. HYNES.